(12) United States Patent
Persinger

(10) Patent No.: US 11,125,311 B2
(45) Date of Patent: Sep. 21, 2021

(54) TORQUE CONVERTER AND METHOD OF ASSEMBLY

(71) Applicant: SCHAEFFLER TECHNOLOGIES AG & CO. KG, Herzogenaurach (DE)

(72) Inventor: Justin Persinger, Norton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 161 days.

(21) Appl. No.: 16/276,190

(22) Filed: Feb. 14, 2019

(65) Prior Publication Data

US 2020/0263773 A1 Aug. 20, 2020

(51) Int. Cl.
  *B23P 15/00* (2006.01)
  *F16H 45/02* (2006.01)
  *B23K 9/007* (2006.01)
  *F16H 41/28* (2006.01)

(52) U.S. Cl.
  CPC ............ *F16H 45/02* (2013.01); *B23K 9/007* (2013.01); *B23P 15/00* (2013.01); *F16H 41/28* (2013.01); *F16H 2045/021* (2013.01); *F16H 2045/0294* (2013.01)

(58) Field of Classification Search
  CPC .. F16H 45/02; F16H 41/28; F16H 2045/0294; F16H 2045/021; F16H 2045/0221; F16H 2045/0284; F16H 41/24; B23P 15/00; B23K 9/007; B23K 2101/008; B23K 11/14; B23K 11/26; B32B 3/06; F16D 25/0635
  See application file for complete search history.

(56) References Cited

U.S. PATENT DOCUMENTS

| 8,967,349 | B2 | 3/2015 | Ushio et al. | |
|---|---|---|---|---|
| 9,180,760 | B2 | 11/2015 | Schleichert et al. | |
| 9,677,654 | B2 | 6/2017 | Jewell | |
| 9,810,302 | B2 | 11/2017 | Sayre et al. | |
| 2002/0134632 | A1* | 9/2002 | Arhab | F16H 45/02 192/3.29 |
| 2011/0120829 | A1* | 5/2011 | Vanni | F16H 45/02 192/3.29 |
| 2013/0224002 | A1 | 8/2013 | Ito et al. | |
| 2014/0157929 | A1 | 6/2014 | Yin | |
| 2015/0300473 | A1 | 10/2015 | Smith | |
| 2018/0172127 | A1 | 6/2018 | Depraete et al. | |
| 2018/0172128 | A1 | 6/2018 | Depraete et al. | |
| 2018/0172129 | A1 | 6/2018 | Depraete et al. | |
| 2018/0238397 | A1* | 8/2018 | Clark | F16H 45/02 |

OTHER PUBLICATIONS

Single Pulse Resistance Welder Instruction Pamphlet, PowerStream Technology, Copyright 2006 Sunstone Engineering, Orem, UT, 5 pages.

* cited by examiner

*Primary Examiner* — Jun S Yoo

(74) *Attorney, Agent, or Firm* — Dickinson Wright PLLC

(57) ABSTRACT

A torque converter includes a cover having a first surface and an annular plate axially spaced from the cover and having a second surface facing the first surface. A disc of the torque converter is disposed between the cover and the plate and has opposing first and second faces adjacent to the first and second surfaces, respectfully. Each of the faces defines a projection joined to one of the first and second surfaces by at least one capacitive discharge weld.

7 Claims, 5 Drawing Sheets

TORQUE CONVERTER AND METHOD OF ASSEMBLY

TECHNICAL FIELD

The present disclosure relates to torque converters having components that are joined together using capacitive-discharge welding.

BACKGROUND

Automatic transmissions may include a torque converter for coupling a transmission input shaft to a crankshaft of an engine. The torque converter may include an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the plates and disks.

SUMMARY

According to one embodiment, a torque converter includes a cover having a first surface and an annular plate axially spaced from the cover and having a second surface facing the first surface. A disc of the torque converter is disposed between the cover and the plate and has opposing first and second faces adjacent to the first and second surfaces, respectfully. Each of the faces defines a projection joined to one of the first and second surfaces by at least one capacitive discharge weld.

According to another embodiment, a method of assembling a torque converter includes providing a disc having opposing first and second faces that each define a projection and positioning a cover against the first face and an annular plate against the second face. The method further includes placing first and second electrodes of a capacitive-discharge welder against the cover and the plate, respectively, and urging the first and second electrodes towards each other to compress the disc between the cover and the plate. The method also includes, during the urging, applying current to one or more of the electrodes to weld the disc to the cover and the plate such that the projections coalesce with a corresponding one of the cover and the plate to form welds.

According to yet another embodiment, a method of assembling a torque converter includes providing a disc having opposing first and second faces that each define a projection and positioning a front cover against the first face. The method further includes placing first and second electrodes of a first capacitive-discharge welder against the front cover and the disc, respectively, and urging the first and second electrodes towards each other to compress the disc and the cover and, simultaneously, applying current to one or more of the electrodes to weld the disc to the cover. The method also includes attaching a bypass-clutch piston to an annular seal plate to form a piston assembly and positioning the piston assembly in the front cover with the seal plate disposed against the second face. The method further includes placing the first and second electrodes of the first capacitive-discharge welder, or first and second electrodes of a second capacitive-discharge welder, against the cover and the plate, respectively, and urging the first and second electrodes of the first or second welders towards each other to compress the disc between the cover and the plate and, simultaneously, applying current to one or more of the electrodes to weld the disc to the plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
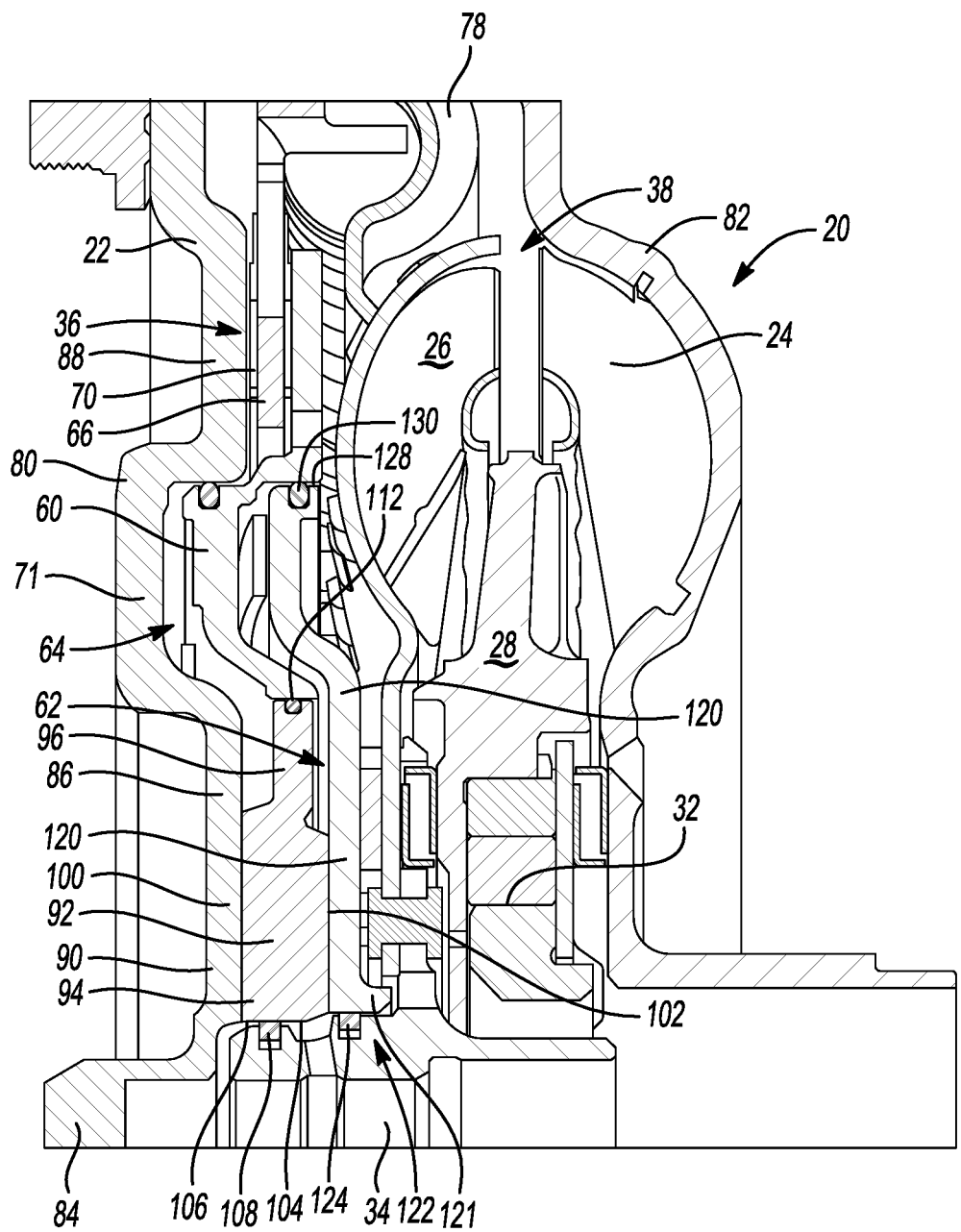
FIG. 1 is a schematic cross-sectional view of a torque converter.

Referring to FIG. 1, a torque converter 20 may be used in a vehicle to couple an automatic transmission to a powerplant, e.g., an engine. For example, the torque converter 20 includes a cover 22 fixed to a crankshaft of the engine. An impeller 24 is fixed to the cover 22 and rotates with the crankshaft. A turbine 26 is disposed adjacent to the impeller 24 within a hydrodynamic chamber 38 of the torque converter 20. The turbine 26 is attached to a turbine hub 34 that is connected, e.g., splined, to a transmission input shaft that supplies power to the transmission.

A stator 28 is coupled to a stator shaft (not shown) by a one-way clutch 32. The stator shaft is fixed to a front support of the transmission and is stationary relative to the torque converter 20. When the transmission input shaft is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. When the speed of the turbine 26 approaches that of the impeller 24, fluid tends to flow around the centerline of the torque converter, causing the one-way clutch 32 to overrun.

The torque converter 20 may include a bypass clutch 36 that mechanically connects the turbine 26 to the cover 22 to bypass the hydrodynamic power flow path of the torque converter 20. The bypass clutch 36 is often engaged during cruise to improve fuel efficiency. The bypass clutch 36 may include a clutch disc 66 operated by a clutch piston 60. The clutch disc 66 may include at least one friction material 70 disposed thereon. The clutch disc 66 is sandwiched between the clutch piston 60 and the cover 22. The clutch 36 is engaged by moving the clutch piston 60 towards the cover 22 to frictionally lock the clutch disc 66 to the cover 22. The turbine 26 is fixed to the clutch disc 66 by a damper 78. Thus, the turbine 26 is fixed to the cover 22 when the bypass clutch 36 is fully engaged to bypass the hydrodynamic power flow path and instead mechanically couple the engine to the transmission. Other bypass clutch designs may be used in the torque converter 20.

The clutch piston 60 may be hydraulically actuated by supplying fluid, e.g., oil, to an apply chamber 62 or a compensation chamber 64. The apply chamber 62 and the compensation chamber 64 may be fluidly isolated from the hydrodynamic chamber 38 and from each other. Two chambers may be considered to be fluidly isolated if they are capable of having meaningfully different pressures. The torque converter 20 includes components that cooperate to define the apply chamber 62 and the compensation chamber 64.

Figure 2:
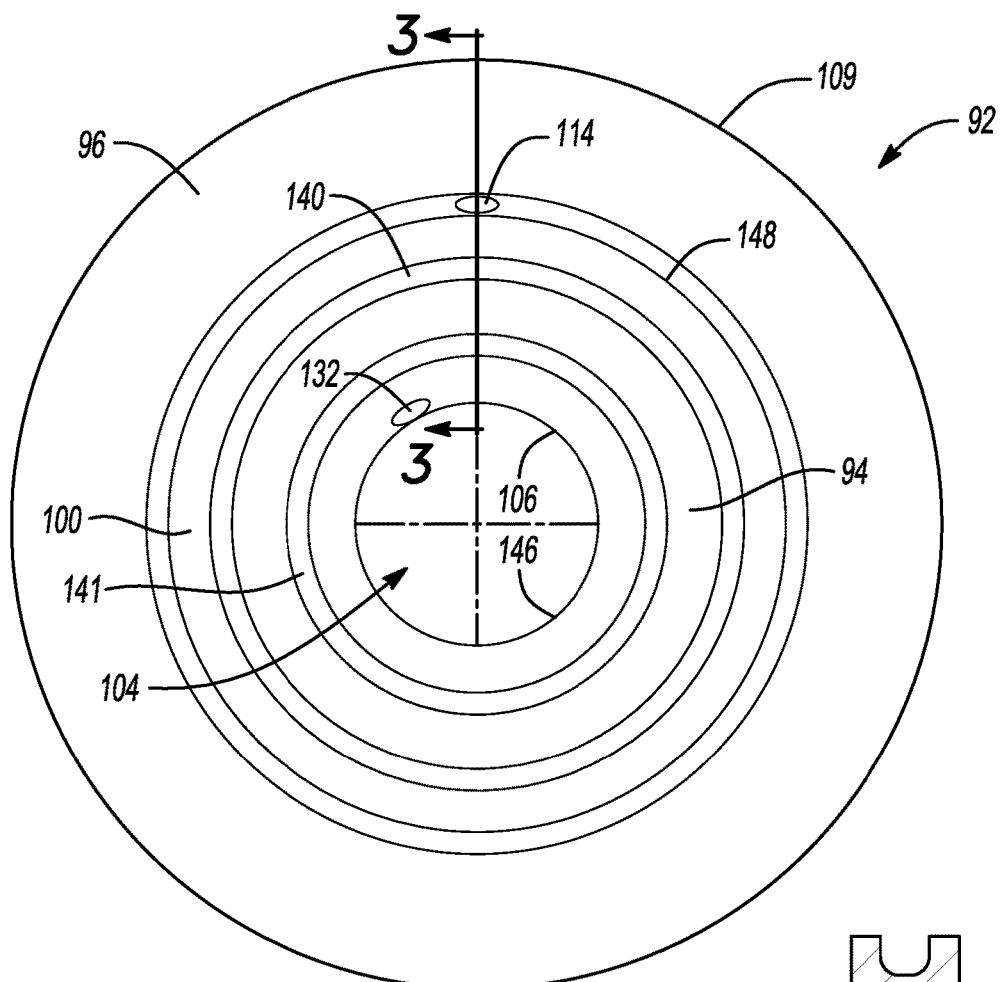
FIG. 2 is a front view of a disc of the torque converter.
Figure 5:
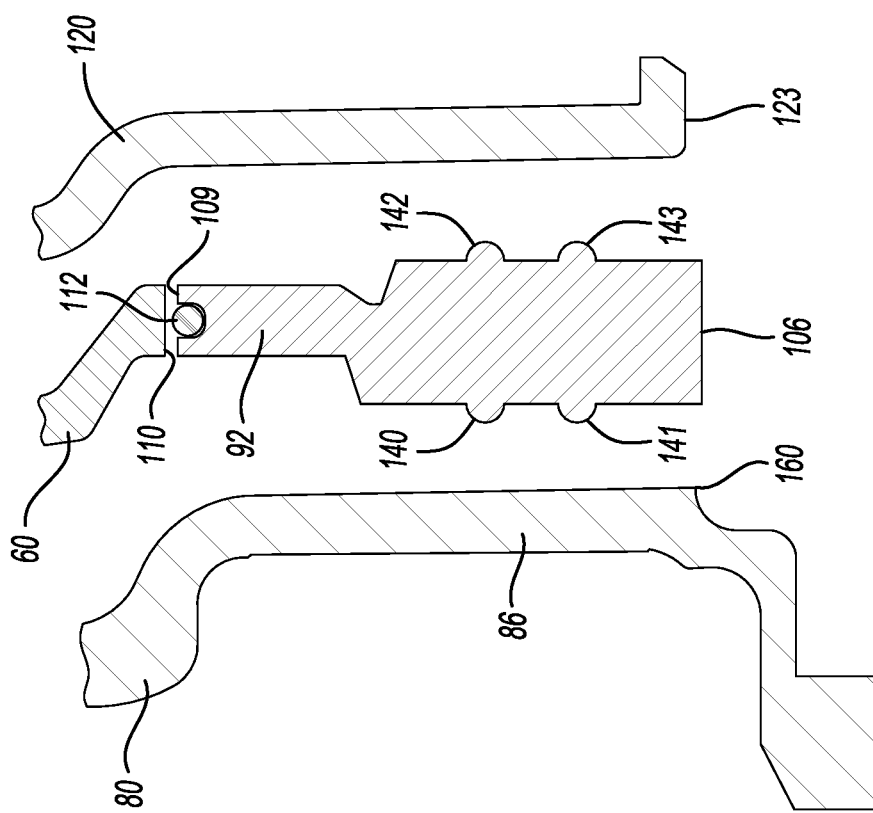
FIG. 5 is a diagrammatical view of a disc being assembled with a front cover and a seal plate.

Referring to FIGS. 1 and 2, according to one or more embodiments, the cover 22 includes a front cover 80 and a back cover 82. The front cover 80 has a pilot portion 84 and a front wall 86 extending outboard therefrom. The front cover 80 may be a single stamping. The front wall 86 may include a radially outboard portion 88 that engages with the clutch 36 and a radially inboard portion 90 that is attached to the front of the disc 92. The disc 92 includes a hub 94 and a flange 96 that is radially outboard of the hub 94. The hub 94 has a front face 100 attached to the front wall 86, and the flange 96 may be axially thinner than the hub 94 so that the flange 96 is spaced apart from the front wall 86. The disc 92 has a central hole 104 that receives the turbine hub 34 and the transmission input shaft therethrough. The hole 104 is defined by a circumferential inner surface 106 of the hub 94. A seal 108 is disposed between the inner surface 106 and the turbine hub 34. An outer circumferential surface 109 of the disc 92 sealably engages an inner circumferential surface 110 of the piston 60. (See FIG. 5). A seal 112 is disposed between the piston 60 and the disc 92. A front side of the disc 92, the front wall 86, and a front side of the piston 60 cooperate to define the compensation chamber 64. The disc 92 may define a passageway 114 (see FIG. 3) configured to convey oil to and/or from the compensation chamber 64.

A back face 102 of the hub 94 is attached to an annular seal plate 120 used to separate the apply chamber 64 from the hydrodynamic chamber 38. The annular plate 120 includes a neck 121 located at a hub portion of the plate 120. The neck 121 is axially thicker than the main portion of the plate to provide a sealing surface from the turbine hub 34. The seal plate 120 may be a stamping. The neck 121 defines a central hole 122 of plate 120. The turbine hub 34 extends through the hole 122. A seal 124 is disposed between an inner circumferential surface 123 (see FIG. 5) of the plate 120 and the turbine hub 34. The seals 108 and 124 create a fluid chamber for the passageway 114. The disc 92 is designed so that the flange 96 is recessed from the back face 102 so that a gap is formed between the plate 120 and the flange 96. The plate 120 includes an outer edge 128 that sealably engages the piston 60. A seal 130 is disposed between the piston 60 and the plate 120. The plate 120, the piston 60, and the disc 92 cooperate to define the apply chamber 62. The disc 92 may define a passageway 132 (see FIG. 3) configured to convey oil to and/or from apply chamber 62.

The disc 92 may be attached to the cover 22 and the plate 120 by capacitive-discharge welding (CD welding). CD welding is a type of resistance welding that achieves coalescence through solid-state welds (although melting may occur in some applications). A CD welder includes large capacitors that store energy for quick release to electrodes that contact the workpiece(s). CD welding has many advantages including high welding currents, very quick welding times, e.g., hundredths of a second, a smaller heat affected zone (typically, the CD weld is complete before the surrounding area heats up), improved weldability of higher carbon steels, simple controls, high repeatability, low electrical power requirements, and long electrode life. Pressure is often used during CD welding and the electrodes may be disposed on a clamp configured to squeeze the workpieces to be joined. Workpieces to be CD welded often include projections or the like on at least one of the workpieces. The projections contact the other workpiece and form the electrical bridge. Since the projections are relatively small, they heat up and soften (or melt) quickly to coalescence with the other workpiece. The simultaneous clamping force deforms the softened or molten projections to bring the workpieces together and form a close joint.

Figure 3:
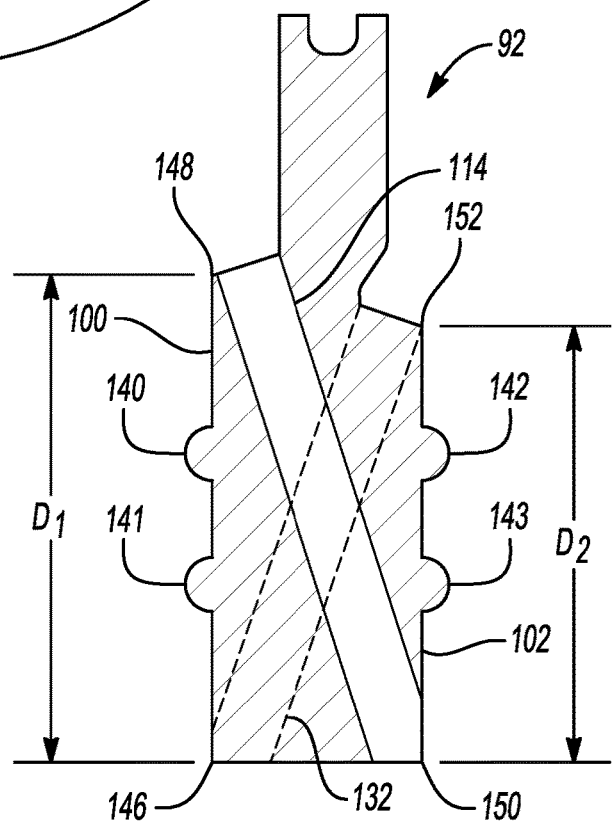
FIG. 3 is a cross-sectional view of the disc along cutline 3-3.

Referring to FIGS. 2 and 3, the front face 100 of the hub 94 defines at least one projection. In the illustrated embodiment, the front face 100 defines a pair of projections 140, 141. The projections 140, 141 may be raised rings that extend circumferentially around the disc 92. The raised rings may completely encircle the face 100. The projections 140, 141 may be concentric with each other, and the projection 140 may have a larger diameter than the projection 141 to create radial spacing between the projections. The front face 100 includes an inner edge 146, an outer edge 148, and a first radial distance ($D_1$) extending therebetween. The projections 140, 141 of the front face 100 are radially spaced from the edges 146, 148 to place the welds within the interior of the joint. The projection 140 may be radially spaced from the edge 148 by a radial distance having a magnitude of at least 2 percent of $D_1$. Similarly, the projection 141 may be radially spaced from the edge 146 by a radial distance having a magnitude of at least 2 percent of $D_1$.

The back face 102 of the hub 94 defines at least one projection. In the illustrated embodiment, the back face 102 defines a pair of projections 142, 143. The projections 142, 143 may be raised rings that extend circumferentially around the disc 92. The raised rings may completely encircle face 102. The projections 142, 143 may be concentric with each other and the projection 142 may have a larger diameter than the projection 143 to create radial spacing between the projections. The back face 102 includes an inner edge 150, an outer edge 152, and a second radial distance ($D_2$) extending therebetween. The projections 142, 143 of the back face 100 are radially spaced from the edges 150, 152 to place the welds within the interior of the joint. The projection 142 may be radially spaced from the edge 152 by a radial distance having a magnitude of at least 2 percent of $D_2$. Similarly, the projection 143 may be radially spaced from the edge 150 by a radial distance having a magnitude of at least 2 percent of $D_2$.

The disc 92 may be joined to the front cover 80 by CD welding the projections 140 and 141 to the front wall 86 of the cover. Similarly, the disc 92 may be joined to the plate 120 by CD welding the projections 142, 143 to the plate. In some embodiments the disc 92 may be welded to the plate 120 and the front cover 80 in a single welding process, or the disc 92 may be welded to the front cover 80 in a first welding process and then welded to the plate 120 in a second welding process. A same welding tool may be used for both the first and second welding processes, or two different welding tools may be used. The CD welding allows the welds to be moved away from the edges where the passageways 114 and 132 are located.

Figure 4:
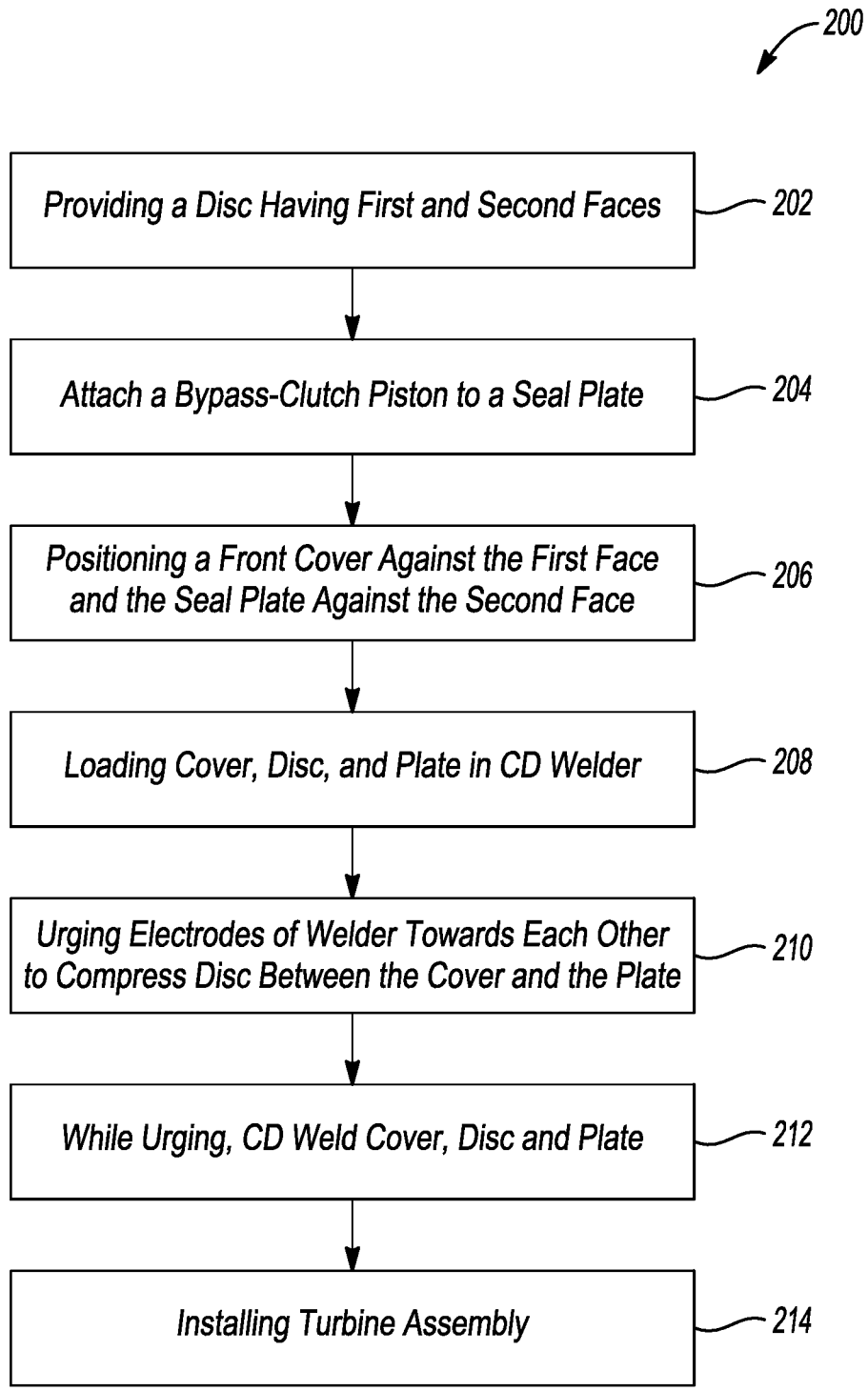
FIG. 4 is a flow chart of a method of assembling a torque converter according to one embodiment.

Described below are example methods of assembling a torque converter using CD welding. Referring to FIG. 4, a method 200 of assembling a torque converter includes providing a disc having first and second opposing faces at step 202. Each of the faces may include a projection as described above. At step 204, a bypass-clutch piston is attached to an annular seal plate. The piston may be attached to the plate via a leaf spring that allows relative axial movement between the piston and the plate.

At step 206, a front cover of the torque converter is positioned against the first face of the disc and the seal plate is positioned against the second face of the disc. The seal plate may be positioned so that the piston is disposed between the front cover and the seal plate. The seal plate may further be positioned so that an outer surface of the disc sealably engages with an inner surface of the piston. With reference to the illustrated embodiment of FIG. 5, as an example, the disc 92 is positioned adjacent to the front cover 80 so that the projections 140, 141 are disposed against front wall 86 of the front cover 80. The inner surface 106 of the disc 92 may be radially aligned with an edge 160 to provide clearance for the turbine hub 34. The annular plate 120 is positioned adjacent to the back face 102 with the projections 142, 143 disposed against a surface of the plate 120. The inner surface 123 of the plate 120 is generally aligned with the inner surface 106 of the disc 92, however, this is not required. The radial placement of the disc 92 and the plate 120 depend upon the shape of the turbine hub 34.

Figure 6:
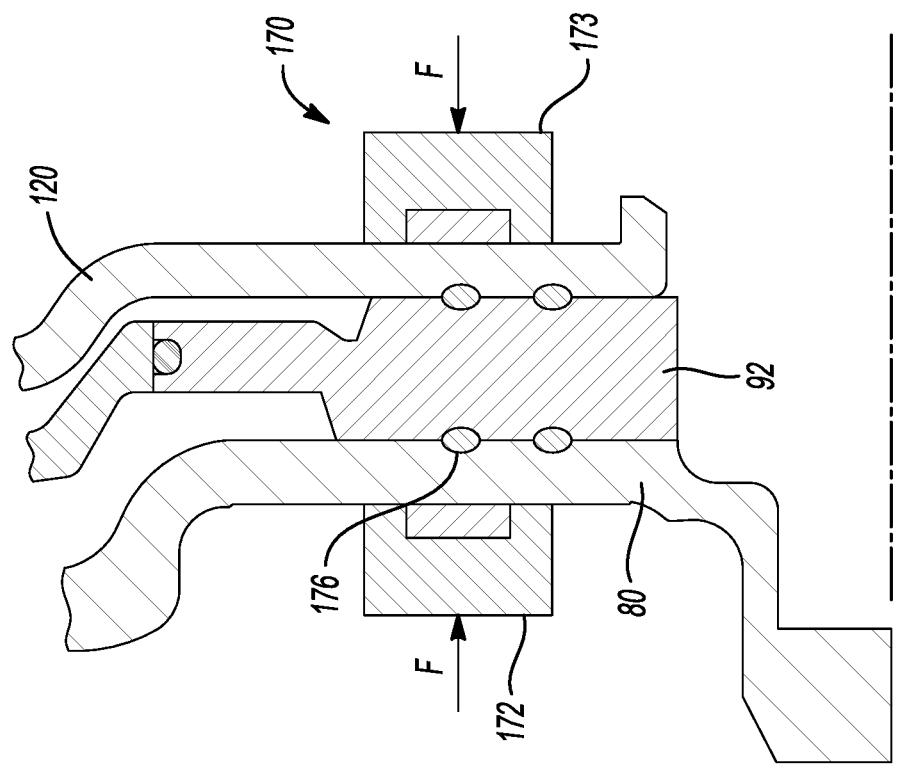
FIG. 6 is diagrammatical view of the disc being capacitive-discharge welded to the front cover and the seal plate.

At step 208, the front cover, disc, and plate are loaded in a CD welder. With reference to the illustrated embodiment of FIG. 6 as an example, A CD welder 170 may include a pair of electrodes 172, 173 configured to move towards and away from each other. The components are loaded in the welder 170 so that electrode 172 is disposed against the front cover 80 and electrode 173 is disposed against the plate 120. The electrodes 172, 173 are urged toward each other to compress the disc 92 between the front cover 80 and the plate 120 at step 210. At step 212, while continuing to urge the electrodes 172, 173 together, the welder supplies current to at least one of the electrodes to CD weld the cover and the plate to the disc. The current travels through the projections, which are the electrical bridges, causing them to heat up and soften (or melt). The compressive pressure flattens the projections to form a close joint. The projections form solid state welds 176 once welding is complete.

At step 214, a turbine assembly including the turbine and the turbine hub is installed in the front cover. The turbine hub is inserted through the central openings of the disc and the plate until a nose of the turbine hub is adjacent (but not touching) the pilot portion of the front cover and the turbine is adjacent to the plate and bypass-clutch piston. A pair of spaced apart seals may be installed on the turbine hub prior to insertion. A forward seal is configured to engage with the inner surface of the disc and a rearward seal is configured to engage with the inner surface of the plate. The seals create a fluid chamber for supplying fluid to one of the passageways defined through the disc.

Figure 7:
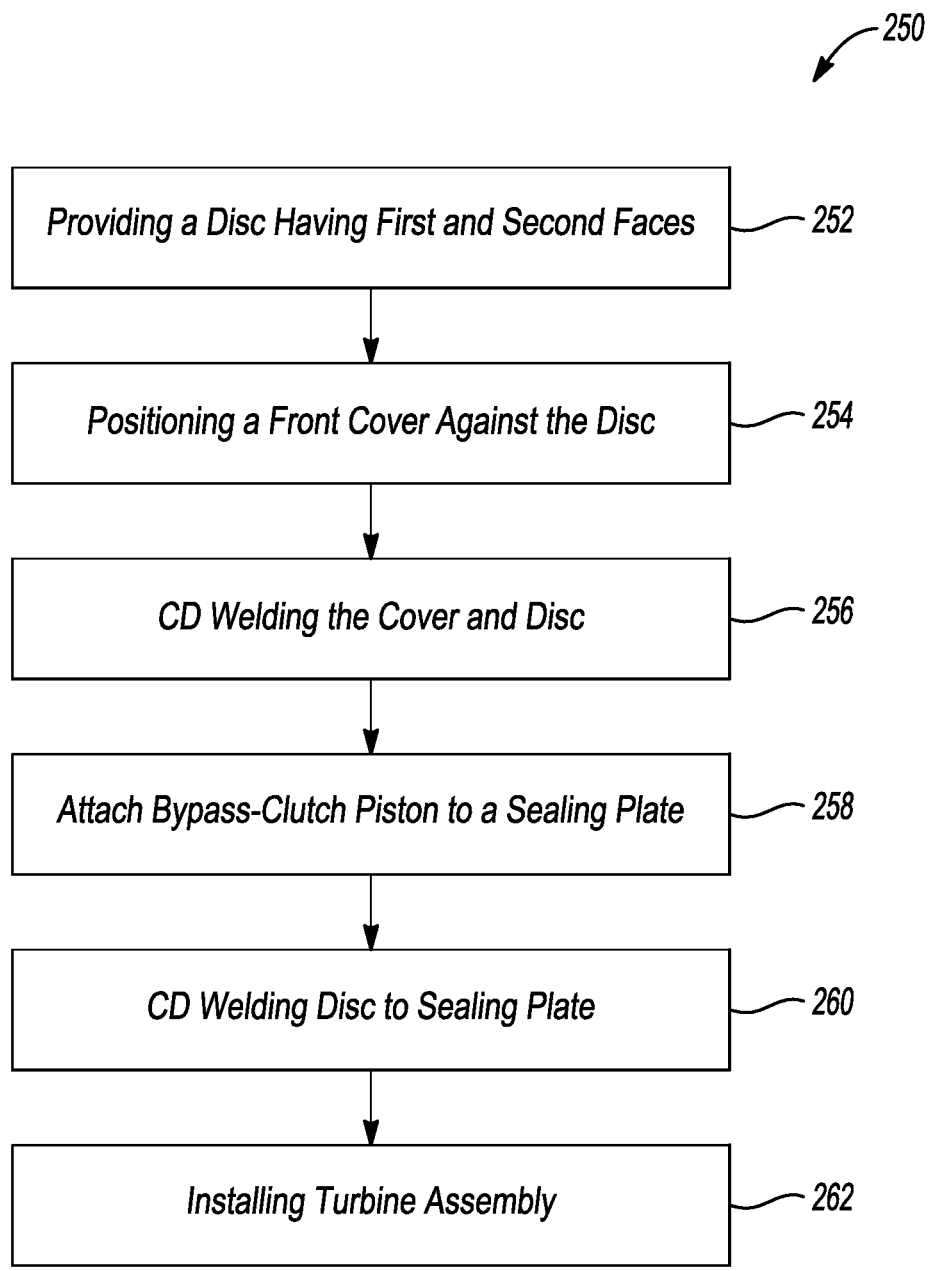
FIG. 7 is a flow chart of a method of assembling a torque converter according to another embodiment.

Referring to FIG. 7, another method 250 of assembling a torque converter includes providing a disc having first and second opposing faces at step 252. Each of the faces may include a projection as described above. At step 254, a front cover of a torque converter is positioned against the first face of the disc. Once positioned, a CD welding tool welds the cover and the disc at step 256. At step 258, a bypass-clutch piston is attached to an annular seal plate to form a piston assembly. The piston assembly is attached to the disc and cover at step 260 by CD welding the plate to the disc. The turbine assembly is installed at step 262 as described above.

The above-discussed method steps are not an exhaustive list of all steps for fully assembling a torque converter and instead explain a representative basis for employing CD welding in torque converter construction. While the method steps are described in a particular sequence, the steps may be performed in other sequences and some steps may be omitted in some embodiments.

The above-described torque convert design may reduce size and weight of the torque converter, reduce costs, and streamline manufacturing. In a typical torque converter, the pilot hub and the above-described disc 92 are a single forging, commonly called a hub. This hub was attached to an inner diameter of a front cover by external laser welds at the joint lines. By using CD welding, which can occur in the interior of the joints, the traditional large hub can be replaced with the smaller and lighter disc 92 and features of the traditional hub can be moved to other components. For example, the pilot hub portion, previously forged, can now be a portion of a front cover stamping, e.g., pilot portion 84. Other features of the traditional hub can also be incorporated with the seal plate and other surrounding components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 torque converter
22 cover 24 impeller
26 turbine
28 stator
32 one-way clutch
34 turbine hub
36 bypass clutch
38 hydrodynamic chamber
60 clutch piston
62 apply chamber
64 compensation chamber
66 clutch disc
70 friction material
78 damper
80 front cover
82 back cover
84 pilot portion
86 front wall
88 outboard portion
90 inboard portion
92 disc
94 hub
96 flange
100 front face
102 back face
104 central hole
106 circumferential inner surface
108 seal
109 outer circumferential surface
110 inner circumferential surface
112 seal
114 passageway
120 annular seal plate
121 neck
122 central hole
123 inner surface
124 seal
128 outer edge
130 seal
132 passageway
140 projection
141 projection
142 projection
143 projection
146 inner edge
148 outer edge
150 inner edge
152 outer edge
160 edge
170 CD welder
172 electrode
173 electrode
176 weld

What is claimed is:

1. A method of assembling a torque converter comprising:
providing a disc having opposing first and second faces that each define a projection;
positioning a cover against the first face and an annular plate against the second face, wherein the disc and the plate have central holes defined by inner circumferential surfaces, respectively;
placing first and second electrodes of a capacitive-discharge welder against the cover and the plate, respectively;
urging the first and second electrodes towards each other to compress the disc between the cover and the plate;
during the urging, applying current to one or more of the electrodes to weld the disc to the cover and the plate such that the projections coalesce with a corresponding one of the cover and the plate to form welds;
installing spaced apart first and second seals on a turbine hub; and
inserting the turbine hub through the central holes so that the first seal is seated on the inner surface of the disc and the second seal is seated on the inner surface of the plate.

2. The method of claim 1, wherein the projections are raised rings.

3. The method of claim 1 further comprising attaching a piston of a bypass clutch to the plate.

4. The method of claim 3, wherein the plate is positioned against the disc so that an outer circumferential surface of the disc sealably engages with the piston.

5. The method of claim 1 further comprising forming a fluid passageway in the disc.

6. A method of assembling a torque converter comprising:
providing a disc having opposing first and second faces that each define a projection;
positioning a front cover against the first face;
placing first and second electrodes of a first capacitive-discharge welder against the front cover and the disc, respectively;
urging the first and second electrodes towards each other to compress the disc and the cover and, simultaneously, applying current to one or more of the electrodes to weld the disc to the cover;
attaching a bypass-clutch piston to an annular seal plate to form a piston assembly;
positioning the piston assembly in the front cover with the seal plate disposed against the second face;
placing the first and second electrodes of the first capacitive-discharge welder, or first and second electrodes of a second capacitive-discharge welder, against the cover and the plate, respectively;
urging the first and second electrodes of the first or second welders towards each other to compress the disc between the cover and the plate and, simultaneously, applying current to one or more of the electrodes to weld the disc to the plate;
installing a turbine hub through a central hole of the annular plate; and
installing a seal on the turbine hub, wherein the seal engages the annular plate.

7. The method of claim 6, wherein the projections are raised rings.

* * * * *